United States Patent
Choi et al.

(10) Patent No.: US 12,730,015 B2
(45) Date of Patent: Sep. 8, 2026

(54) TEMPERATURE MEASUREMENT DEVICE AND ENERGY STORAGE DEVICE INCLUDING SAME

(71) Applicant: LS ELECTRIC CO., LTD., Anyang-si (KR)

(72) Inventors: Hyung Suk Choi, Anyang-si (KR); Soo Hwan Han, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 803 days.

(21) Appl. No.: 18/026,719

(22) PCT Filed: Aug. 19, 2021

(86) PCT No.: PCT/KR2021/011048
§ 371 (c)(1),
(2) Date: Jul. 6, 2023

(87) PCT Pub. No.: WO2022/059938
PCT Pub. Date: Mar. 24, 2022

(65) Prior Publication Data

US 2024/0035904 A1 Feb. 1, 2024

(30) Foreign Application Priority Data

Sep. 16, 2020 (KR) ........................ 10-2020-0119392

(51) Int. Cl.
*G01K 11/324* (2021.01)
*H01M 10/48* (2006.01)
*H01M 50/204* (2021.01)

(52) U.S. Cl.
CPC ......... *G01K 11/324* (2021.01); *H01M 10/486* (2013.01); *H01M 50/204* (2021.01)

(58) Field of Classification Search
CPC .. H01M 10/486; H01M 50/204; H01M 10/48; H01M 50/20; H01M 10/482;
(Continued)

(56) References Cited

U.S. PATENT DOCUMENTS 8,232,017 B2 * 7/2012 Haltiner, Jr. ........ H01M 8/2432 429/442
2005/0213867 A1 9/2005 Rajendran et al.
(Continued)

FOREIGN PATENT DOCUMENTS

JP 2009053159 A 3/2009
JP 6398139 B2 10/2018
(Continued)

OTHER PUBLICATIONS

KR 10-0812742 machine English translation (Year: 2008).*
(Continued)

*Primary Examiner* — Michael L Dignan
(74) *Attorney, Agent, or Firm* — K&L Gates LLP

(57) ABSTRACT

A temperature measurement device according to an embodiment of the present disclosure may be provided in an energy storage device having a plurality of power device modules. The temperature measurement device may comprise a plurality of sensing spots for temperature sensing, wherein the plurality of sensing spots may include: optical fiber cables spaced a regular unit distance apart from each other; and a plurality cable fixing units disposed between the plurality of power device modules to fix the optical fiber cables. The optical fiber cables may comprise: a plurality of inner sections which are placed between the plurality of power device modules and fixed to the cable fixing units; and at least one outer section which connects the plurality of inner sections in series to each other and has a larger length than the unit distance.

10 Claims, 8 Drawing Sheets

(58) Field of Classification Search
CPC ............ H01M 10/488; H01M 2220/10; H01K 11/324; H01K 11/3206; Y02E 60/10
See application file for complete search history.

(56) References Cited

U.S. PATENT DOCUMENTS

| | | | | |
|---|---|---|---|---|
| 2006/0115204 | A1* | 6/2006 | Marsh | E21B 47/07 374/E11.015 |
| 2015/0280290 | A1 | 10/2015 | Saha et al. | |
| 2022/0333976 | A1* | 10/2022 | Cuenot | G01K 11/3206 |
| 2023/0071601 | A1* | 3/2023 | Singer | H02J 7/54 |

FOREIGN PATENT DOCUMENTS

| | | | | |
|---|---|---|---|---|
| KR | 10-0812742 | * | 3/2008 | H01M 10/48 |
| KR | 100812742 | B1 | 3/2008 | |
| KR | 101309952 | B1 | 9/2013 | |
| KR | 102106153 | B1 | 5/2020 | |
| WO | WO 2015-046635 | * | 4/2015 | H01M 2/20 |

OTHER PUBLICATIONS

WO 2015-046635 machine English translation (Year: 2015).*
International Search Report for related International Application No. PCT/KR2021/011048; action dated Mar. 24, 2022; (5 pages).
Written Opinion for related International Application No. PCT/KR2021/011048; action dated Mar. 24, 2022; (8 pages).

* cited by examiner

TEMPERATURE MEASUREMENT DEVICE AND ENERGY STORAGE DEVICE INCLUDING SAME

CROSS-REFERENCE TO RELATED APPLICATIONS

This application is the National Stage filing under 35 U.S.C. 371 of International Application No. PCT/KR2021/011048, filed on Aug. 19, 2021, which claims the benefit of earlier filing date and right of priority to Korea utility model Application No. 10-2020-0119392 filed on Sep. 16, 2020, the contents of which are all hereby incorporated by reference herein in their entirety.

FIELD

The present disclosure relates to a temperature measurement device for measuring temperatures of power device modules, and an energy storage device including the same.

BACKGROUND

In general, an energy storage device (energy storage system, ESS) refers to a device that stores energy using a physical medium. The energy storage may be classified into physical energy storage and chemical energy storage schemes, depending on a storage scheme. Representative physical energy storage may include pumping-up power generation, compressed air storage, flywheel, and the like. The chemical energy storage is mainly storage using a battery, and includes a lithium ion battery, a lead-acid battery, a sodium sulfur (NAS) battery, and the like. In this regard, a battery-type ESS is referred to as a battery energy storage system (BESS), and an ESS generally refers to the BESS.

An energy storage device using the battery generates a lot of heat, so that it is important to manage the heat to prevent fire. To this end, the energy storage device is usually equipped with a temperature sensor therein.

The energy storage device according to the prior art is usually constructed in units of a cell, a module, and a rack.

Referring to FIG. 1, the energy storage device using the battery is formed in a shape of a rack 1. The rack 1 is formed in a shape in which battery modules 2 are stacked in multiple stages in a structure such as a beam. In this regard, each battery module 2 is composed of a combination of multiple battery cells (not shown). In this regard, each battery module 2 is usually equipped with a temperature sensor (not shown) therein for measuring a temperature by itself.

However, when such a temperature sensor is broken, the temperature measurement of the battery module 2 is not possible. In addition, because the temperature sensor is disposed inside the battery module 2, a measurement of a temperature between the adjacent battery modules 2 is not possible. In other words, when the temperature sensor is broken, because a temperature measurement around the battery module 2 is not performed, a temperature management of the rack 1 cannot be achieved.

SUMMARY

A purpose of the present disclosure is to provide a temperature measurement device capable of sensing not only a temperature of a space between a plurality of power device modules, but also a temperature outside the space, and an energy storage device including the same.

Another purpose of the present disclosure is to provide a temperature measurement device that is easy to be inspected and replaced, and an energy storage device including the same.

A temperature measurement device according to an embodiment of the present disclosure is disposed in an energy storage device equipped with a plurality of power device modules arranged in multiple stages. The temperature measurement device includes an optical fiber cable including a plurality of sensing spots for sensing temperatures, wherein the plurality of sensing spots are spaced apart from each other by a predetermined unit spacing, and a plurality of cable fixing units respectively disposed between the multiple stages of the plurality of power device modules and fixing the optical fiber cable. The optical fiber cable includes a plurality of inner sections respectively positioned between the multiple stages of the plurality of power device modules and respectively fixed to the cable fixing units, and at least one outer section for connecting the plurality of inner sections to each other in series and having a length greater than the unit spacing.

The temperature measurement device may further include a controller connected to the optical fiber cable, wherein the controller visualizes temperature information sensed from the plurality of sensing spots as a graph and outputs the graph on a display.

The outer section may be located adjacent to one circumferential surface of an outermost power device module in a stage.

The outer section may include a curled portion positioned to overlap one circumferential surface of an outermost power device module in a stage in a horizontal direction and having a shape rolled at least once.

The outer section may include a plurality of outer sections, and a plurality of curled portions of the plurality of outer sections may be arranged in a row in a vertical direction.

A curvature radius of the curled portion may be 20 times or more the cross-sectional diameter of the optical fiber cable.

The number of sensing spots located in the inner section may be greater than the number of sensing spots located in the outer section.

The outer section may include a plurality of outer sections, and the plurality of outer sections may include a first outer section located in front of a foremost power device module in one stage, and a second outer section located at the rear of a rearmost power device module in another stage adjacent to the one stage. The first outer section and the second outer section may be located alternately with each other.

An energy storage device according an embodiment of the present disclosure includes a rack, a plurality of power device modules installed in multiple stages in the rack, an optical fiber cable including a plurality of sensing spots for sensing temperatures, wherein the plurality of sensing spots are spaced apart from each other by a predetermined unit spacing, and a plurality of cable fixing units respectively disposed on upper surfaces of power device modules in the respective stages, and fixing the optical fiber cable.

The optical fiber cable may include a plurality of inner sections respectively positioned between the multiple stages of the plurality of power device modules and respectively fixed to the cable fixing units, and at least one outer section for connecting the plurality of inner sections to each other in series and having a length greater than the unit spacing.

The energy storage device may further include at least one hook formed on the rack and fixing the at least one outer section of the optical fiber cable.

The outer section may include a curled portion positioned to overlap a front surface of a foremost power device module or a rear surface of a rearmost power device module in a stage in a stage in a horizontal direction and having a shape rolled at least once.

The power device module may be a battery module.

According to a preferred embodiment of the present disclosure, because the outer section of the optical fiber cable has the length greater than the unit spacing between the sensing spots, the outer section may include the at least one sensing spot. Therefore, there is the advantage of sensing the temperature around the power device module via the outer section of the optical fiber cable.

In addition, because the outer section of the optical fiber cable is located outside the space between the plurality of power device modules, a temperature of a chamber (indoor) in which the energy storage device is installed may be sensed via the outer section of the optical fiber cable.

In addition, because the outer section of the optical fiber cable has the greater length than the unit spacing between the sensing spots, there is the margin in the length of the outer section. Thus, the inspection and the replacement of the power device module or the temperature measurement device may be facilitated.

In addition, in the graph visualizing the temperature information sensed from the optical fiber cable, the high-temperature sections corresponding to the temperatures sensed from the inner sections and the low-temperature sections corresponding to the temperatures sensed from the outer sections may be displayed so as to be clearly distinguished from each other. Accordingly, the administrator may rapidly and intuitively identify whether the specific portion of the graph is the temperature of the space between the plurality of power device modules or the temperature outside the space.

In addition, because the plurality of high-temperature sections are displayed so as to be distinguished from each other in the graph, the administrator may intuitively and rapidly identify which stage power device module's temperature each portion of the graph corresponds to.

In addition, the outer section may include the curled portion having the shape rolled at least once. Thus, within the limited area size corresponding to the one circumferential surface (e.g., the front surface) of the foremost power device module, the outer section may include the at least one sensing spot.

In addition, the curled portion may be positioned to overlap the one circumferential surface of the foremost power device module in the horizontal direction. Accordingly, the temperature measurement areas of the plurality of curled portions may be prevented from interfering with or overlapping with each other.

In addition, the plurality of curled portions may be arranged in the line in the vertical direction. As a result, the plurality of curled portions may consistently measure the temperatures of the same area of the plurality of foremost power device modules in the respective stages.

In addition, the radius of curvature of the curled portion may be 20 times or more the cross-sectional diameter of the optical fiber cable. As such, the reliability of the temperature sensing of the curled portion may be guaranteed.

In addition, the number of sensing spots located in the inner section may be greater than the number of sensing spots located in the outer section. Accordingly, the temperature distribution of the one surface (e.g., the upper surface) of the stage of the power device modules may be reliably sensed with the high resolution via the inner section.

DETAILED DESCRIPTION

Hereinafter, a specific embodiment of the present disclosure will be described in detail with the drawings.

Hereinafter, when one element is described as being "fastened" or "connected" to another element, it may mean that the two elements are directly fastened or connected to each other, or a third element exists between the two elements and the two elements are connected or fastened to each other by the third element. On the other hand, when one element is described as being "directly fastened" or "directly connected" to another element, it will be understood that there is no third element between the two elements.

Figure 1:
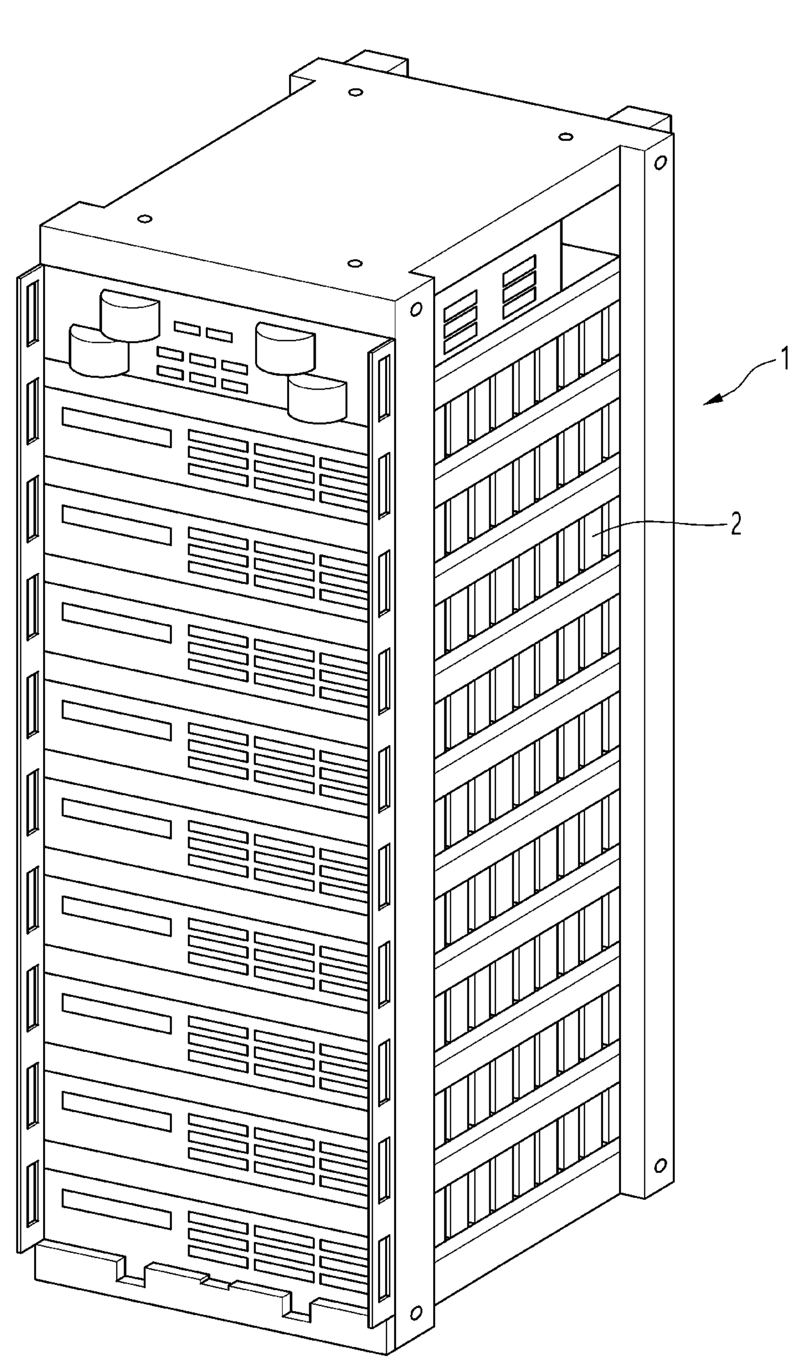
FIG. 1 is a perspective view of an energy storage device according to the prior art.
Figure 2:
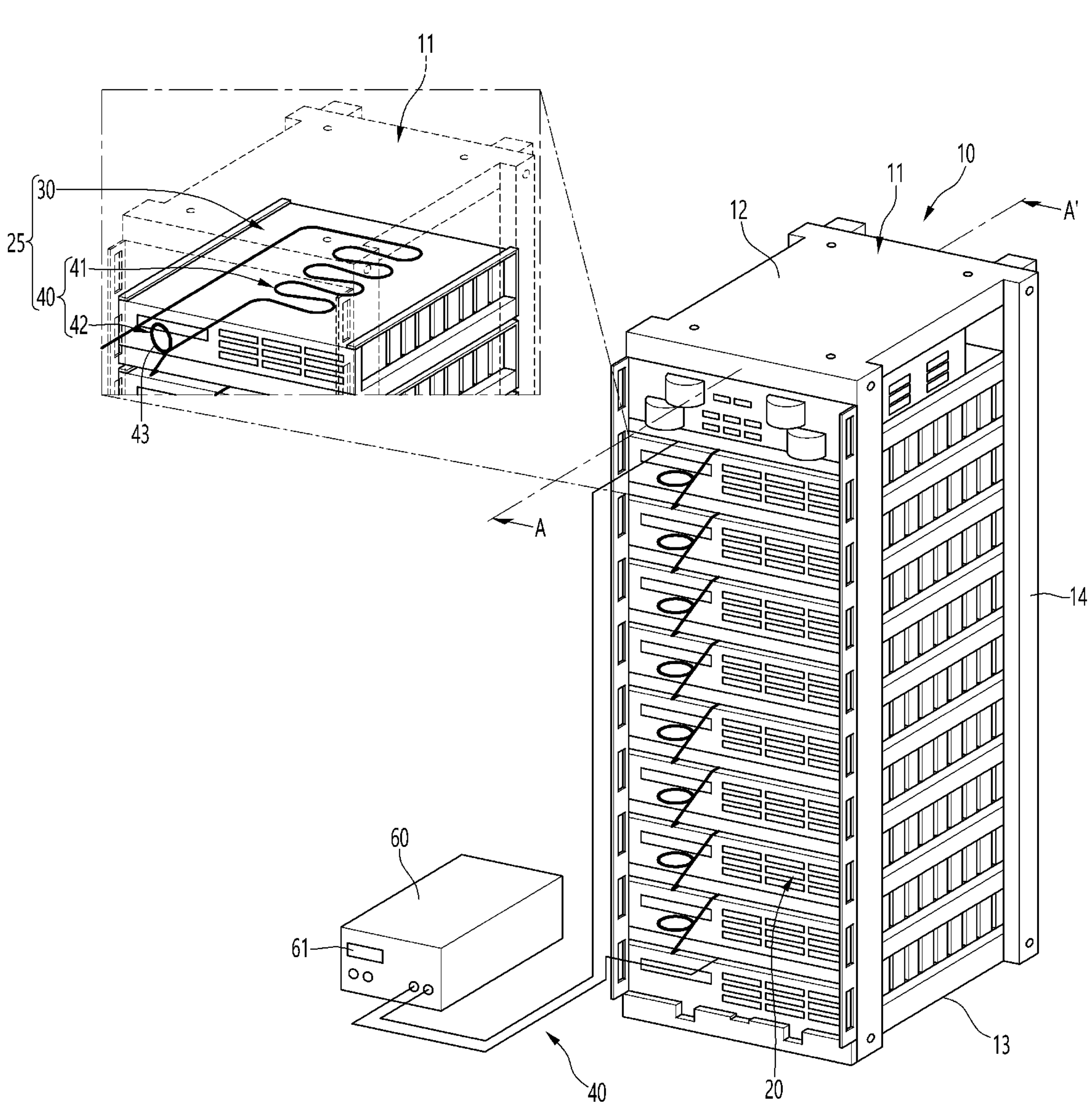
FIG. 2 is a diagram illustrating an energy storage device and a temperature measurement device included therein according to an embodiment of the present disclosure.
Figure 3:
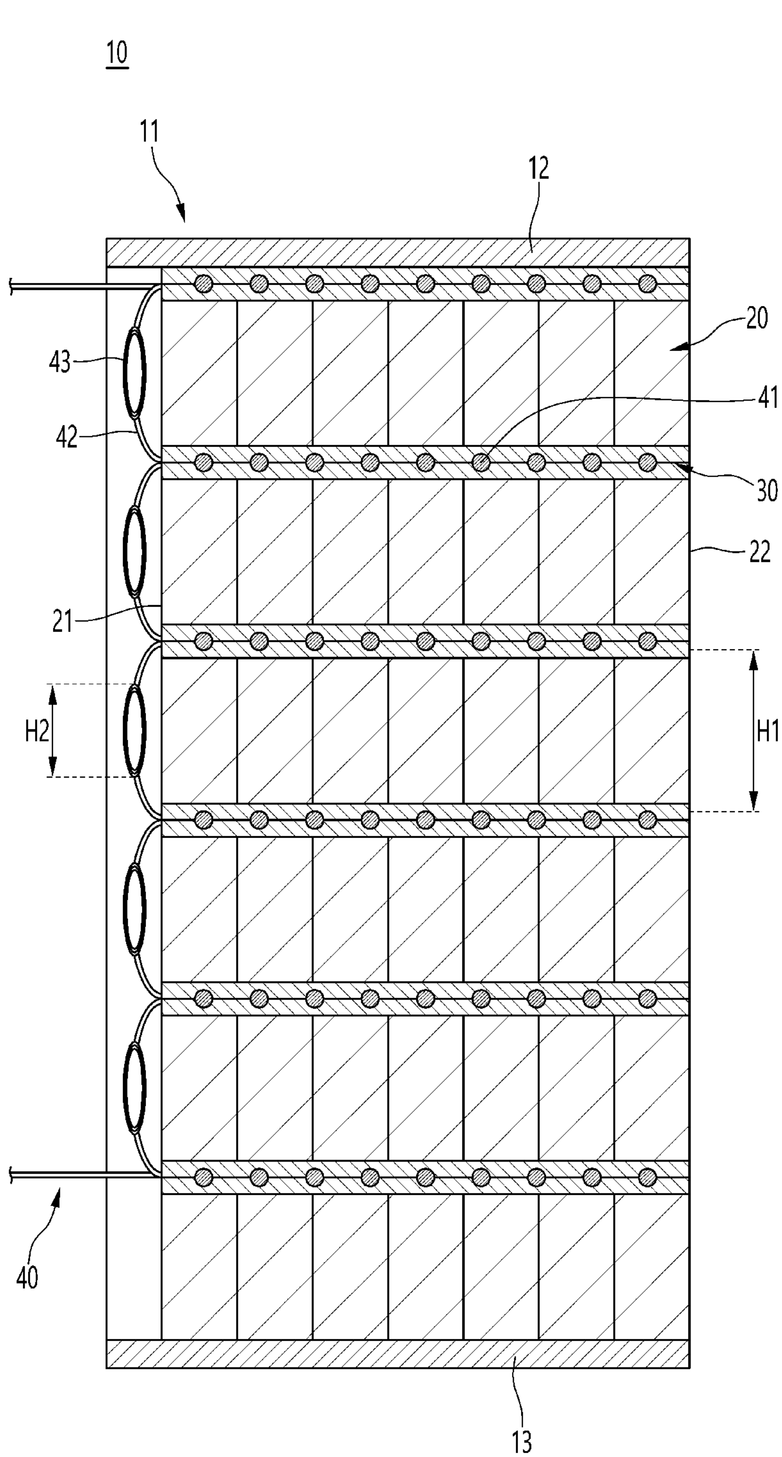
FIG. 3 is a cross-sectional view taken along a line A-A' in FIG. 2.
Figure 4:
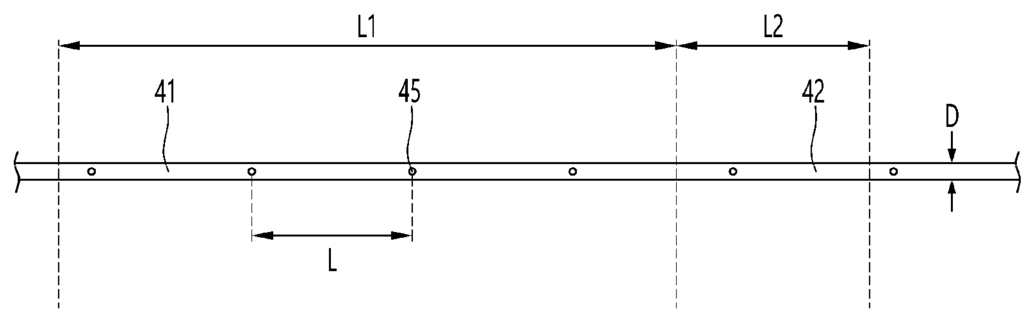
FIG. 4 is a diagram illustrating an unfolded state of an optical fiber cable according to an embodiment of the present disclosure.

FIG. 2 is a diagram illustrating an energy storage device and a temperature measurement device included therein according to an embodiment of the present disclosure, FIG. 3 is a cross-sectional view taken along a line A-A' in FIG. 2, and FIG. 4 is a diagram illustrating an unfolded state of an optical fiber cable according to an embodiment of the present disclosure.

An energy storage device 10 according to an embodiment of the present disclosure may include a rack 11, a plurality of power device modules 20, and a plurality of temperature measurement devices 25.

The rack 11 may be constructed such that the plurality of power device modules 20 are installed in multiple stages. Hereinafter, a case in which the power device module 20 is a battery module will be described as an example, and the same reference numeral will be used for convenience.

In more detail, the rack 11 may include an upper plate 12, a lower plate 13, and a plurality of frames 14 extending vertically while connecting the upper plate 12 and the lower plate 13 to each other.

The plurality of battery modules 20 may be installed in the rack 11 in the multiple stages in the vertical direction. Each battery module 20 may operate like a drawer and may be inserted and installed in the rack 11 in a horizontal direction.

To this end, a module guide for guiding the installation of the battery module 20 may be disposed in the rack 11. For example, the module guide may be a supporting plate for supporting the battery module 20. As another example, the module guide may be a rail or a rail counterpart for guiding the insertion of the battery module 20.

The temperature measurement device 25 may sense a temperature of the battery module 20 and a temperature around the battery module 20. The temperature measurement device 25 measures a surface temperature of the battery module 20 or a space temperature between the battery modules 20.

In more detail, the temperature measurement device 25 may include a cable fixing unit 30 and an optical fiber cable 40.

Each cable fixing unit 30 may be disposed to be in surface contact with one surface (e.g., an upper surface) of each stage of the battery modules 20 or may be installed to have a predetermined gap with the one surface.

The cable fixing unit 30 may fix the optical fiber cable 40. In more detail, the cable fixing unit 30 may fix the optical fiber cable 40 in a state of being bent along a predetermined path.

The cable fixing unit 30 may have a panel or frame shape. A configuration of the cable fixing unit 30 will be described in detail later.

A plurality of cable fixing units 30 may be respectively located between the multiple stages of the plurality of battery modules 20. In more detail, each cable fixing unit 30 may be located between each pair of stages of battery modules 20 adjacent to each other. However, a cable fixing unit 30 located at an uppermost stage may be located on the battery modules 20 located at an uppermost stage.

Each cable fixing unit 30 may operate like the drawer and may be inserted and installed between each pair of stages of battery modules 20 adjacent to each other.

To this end, a unit guide for guiding the installation of the cable fixing unit 30 may be disposed in the rack 11 or on the battery module 20. For example, the unit guide may be a supporting plate for supporting the cable fixing unit 30. As another example, the unit guide may be a rail or a rail counterpart that guides the insertion of the cable fixing unit 30.

However, in one example, the separate unit guide may not be equipped and upper and lower surfaces of the battery modules 20 may guide the insertion and installation of the cable fixing unit 30.

The optical fiber cable 40 may be a single cable. However, the present disclosure is not limited thereto.

A scheme of measuring the temperature using the optical fiber cable 40 is applied to a temperature measurement of conventional power underground lines, oil refinery and chemical pipelines, and the like, and is also referred to as distributed temperature sensing (DTS). The distributed temperature sensing utilizes proportional characteristics of temperature and wavelength, one of unique characteristics of an optical fiber.

There are three types of scattering waves that are reflected by quartz constituting the optical fiber: a Rayleigh-scattering wave, a Raman-scattering wave, and a Brillouin-scattering wave. Among these, the Raman wave shows a wavelength that is directly proportional to a temperature. This may be used to measure the temperature (convert the measured wavelength into the temperature based on a magnitude).

Referring to FIG. 4, the optical fiber cable 40 is formed linearly. Therefore, a temperature of the optical fiber cable 40 may be measured by measuring a scattering frequency of the optical fiber cable 40 at regular unit spacings L. That is, the optical fiber cable 40 may include a plurality of sensing spots 45 for sensing the temperatures, and the plurality of sensing spots 45 may be spaced apart from each other by the regular unit spacing L along the optical fiber cable 40.

For example, the unit spacing L may be 50 cm, and a resolution of each sensing spot may be 0.01° C. That is, the temperature of the optical fiber cable 40 may be measured with the resolution of 0.01° C. for each 50 cm. The unit spacing and the resolution of the optical fiber cable 40 may vary as needed.

The optical fiber cable 40 may include a plurality of inner sections 41 respectively located between the stages of battery modules 20 and at least one outer section 42 for connecting the plurality of inner sections 41 to each other in series.

Each inner section 41 may be fixed to each cable fixing unit 30 and may be positioned between each pair of stages of battery modules 20 adjacent to each other. Therefore, a temperature of the one surface (e.g., the upper surface) of each stage of the battery modules 20 may be sensed via each inner section 41.

In more detail, the one surface (e.g., the upper surface) of each stage of the battery modules 20 may be divided into multiple areas. Each area may be an area in which battery cells inside the battery module 20 are separated physically, such as via a partition or a partition wall, or a virtual area defined by dividing the upper surface of each stage of the battery modules 20 into areas with a predetermined area size.

To measure temperatures of the multiple areas, each inner section 41 of the optical fiber cable 40 may have the plurality of sensing spots 45. An arrangement shape of the optical fiber cable 40 may be determined such that the plurality of sensing spots 45 may be appropriately arranged on the respective areas.

To secure the plurality of sensing spots 45 within a limited area size corresponding to the one surface of each stage of the battery modules 20, the inner section 41 of the optical fiber cable 40 may be bent at least once. That is, each cable fixing unit 30 may fix each inner section 41 in the bent state along a predetermined path.

The plurality of inner sections 41 may have shapes and lengths corresponding to each other. Each inner section 41 may include the plurality of sensing spots 45. That is, a length L1 of each inner section 41 may be greater than twice the unit spacing L between a pair of sensing spots 45 adjacent to each other.

Therefore, a temperature distribution of the one surface of each stage of the battery modules 20 may be reliably sensed via each inner section 41.

Each outer section 42 may be located outside of a space between the battery modules in each stage. Each outer section 42 may be positioned adjacent to one circumferential surface of a foremost battery module 20 in each stage. In the present embodiment, each of the at least one outer section 42 may be positioned adjacent to a front surface 21 of the foremost battery module 20 in each stage.

When there are a plurality of outer sections 42, the plurality of outer sections 42 may have shapes and lengths corresponding to each other. Each outer section 42 may include at least one sensing spot 45. That is, a length L2 of each outer section 42 may be greater than the unit spacing L between the pair of sensing spots 45 adjacent to each other.

Therefore, a temperature of the circumferential surface of the foremost battery module in each stage or a temperature around such battery module 20 may be sensed via each outer section 42. In addition, because the length of the outer section 42 has a margin, inspection and replacement of the battery module 20 or the temperature measurement device 25 may be facilitated.

The length L1 of each inner section 41 may be greater than the length L2 of each outer section 42. That is, the number of sensing spots 45 located in each inner section 41 may be greater than the number of sensing spots 45 located in each outer section 42. For example, each inner section 41 may include four sensing spots 45, and each outer section 42 may include one sensing spot 45.

To secure at least one sensing spot 45 within a limited area size corresponding to the one circumferential surface (e.g., the front surface) of the foremost battery module 20 in each stage, the outer section 42 of the optical fiber cable 40 may include a curled portion 43 having a shape that has been rolled at least once. The curled portion 43 may form a ring shape. The curled portion 43 may include the at least one sensing spot 45.

A radius of curvature of the curled portion 43 may be 20 times or more the cross-sectional diameter D of the optical fiber cable 40. This is in consideration of material characteristics of the optical fiber cable 40. In the optical fiber cable 40, reliability of the temperature sensing may be guaranteed only when a radius of curvature of each point over an entire section is maintained at least 20 times the cross-sectional diameter of the optical fiber cable 40.

The curled portion 43 may be positioned to overlap the one circumferential surface of the foremost battery module 20 in each stage in the horizontal direction. In more detail, a height H2 of each curled portion 43 may be smaller than a height H1 of each battery module 20.

Accordingly, temperature measurement areas of the plurality of curled portions 43 may be prevented from interfering with or overlapping with each other. That is, there is an advantage in that the temperatures around the foremost battery modules 20 of the respective stages may be reliably measured via the plurality of curled portions 43, respectively.

The plurality of curled portions 43 may be arranged in a line. In more detail, the plurality of curled portions 43 may be arranged in the line in the vertical direction. Therefore, temperatures of the same area of the respective stages of the plurality of battery modules 20 may be consistently measured via the plurality of curled portions 43.

In one example, the energy storage device 10 may further include a controller 60 having at least one processor.

The optical fiber cable 40, more specifically, one end of the optical fiber cable 40 may be connected to the controller 60. The controller 60 may receive a plurality of temperature information sensed from the plurality of sensing spots 45 included in the optical fiber cable 40. For example, the controller 60 may be configured as a DTS server.

The controller 60 may display or indicate a warning alarm on an output interface when there is temperature information out of a preset limited temperature range among the plurality of temperature information from the plurality of sensing spots 45. For example, the output interface may include a display 61.

Alternatively, the controller 60 may include a communication module that is in communication with a terminal or the like, and may display or indicate the warning alarm on the terminal for an operator.

Figure 5:
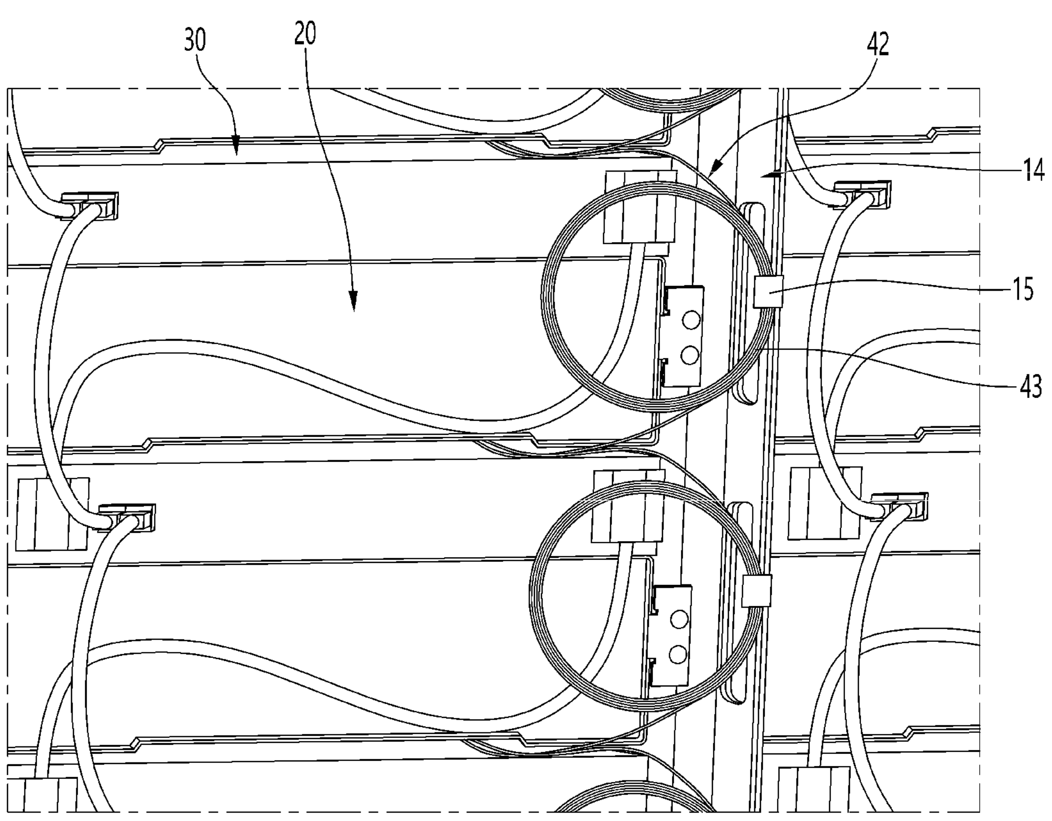
FIG. 5 is an enlarged view of a second section of an optical fiber cable and surroundings thereof according to an embodiment of the present disclosure.

FIG. 5 is an enlarged view of a second section of an optical fiber cable and surroundings thereof according to an embodiment of the present disclosure.

At least one hook 15 for fixing the at least one outer section 42 of the optical fiber cable 40 may be formed on the rack 11. In more detail, each hook 15 may fix each curled portion 43.

A plurality of hooks 15 may be formed on the frame 14 of the rack 11. The plurality of hooks 15 may be spaced apart from each other by a predetermined distance in the vertical direction and arranged in a line.

By means of each hook 15, each curled portion 43 may be supported without sagging downward. Therefore, the temperature around the foremost battery module 20 in each stage may be reliably sensed via each outer section 42.

Figure 6:
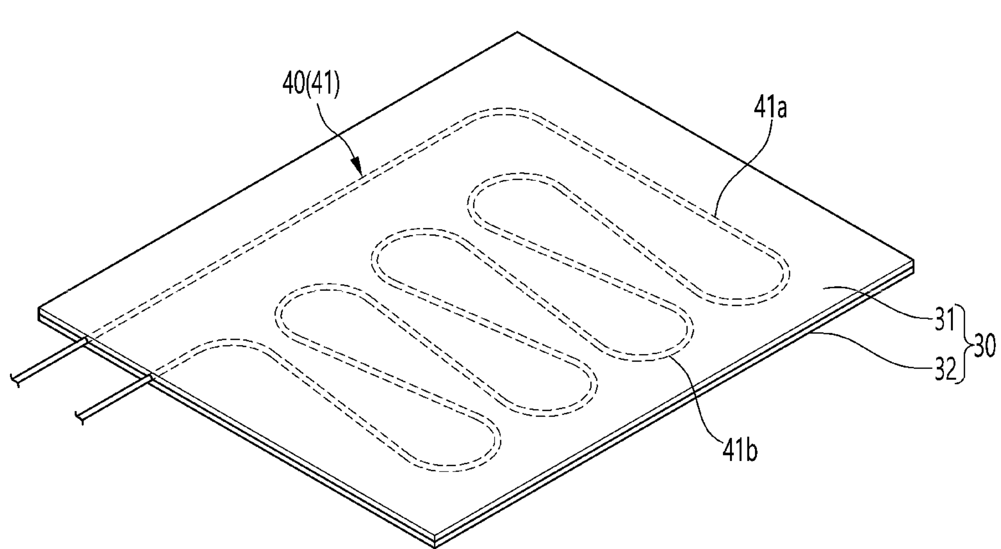
FIG. 6 is a perspective view illustrating an example of a cable fixing unit.

FIG. 6 is a perspective view illustrating an example of a cable fixing unit.

For example, the cable fixing unit 30 may include one or more panels 31 or 32. In more detail, the cable fixing unit 30 may include an upper panel 31 and a lower panel 32 attached to a lower surface of the upper panel 31. The optical fiber cable 40, more specifically, the inner section 41, may be inserted and installed between the upper panel 31 and the lower panel 32. That is, an accommodation groove for accommodating the optical fiber cable 40 may be defined in at least one of the upper panel 31 and the lower panel 32.

The upper panel 31 and the lower panel 32 may be thin plates in a form of boards or films. Therefore, a load applied to each battery module 20 or the rack 11 may be reduced and a space required for installing the cable fixing unit 30 may be reduced.

The upper panel 31 and the lower panel 32 may be made of a material having good heat resistance, such as a Teflon sheet.

However, the present disclosure may not be limited thereto, and the cable fixing unit 30 may be composed of a single panel and the optical fiber cable 40 may be attached to or fixed to one surface of the panel.

As described above, the inner section 41 of the optical fiber cable 40 may be bent at least once. In more detail, the inner section 41 may have a zigzag shape including a plurality of straight portions 41*a* and a plurality of curved portions 41*b*.

A radius of curvature of the curved portion 41*b* may be 20 times or more the cross-sectional diameter D of the optical fiber cable 40 (see FIG. 4).

Figure 7:
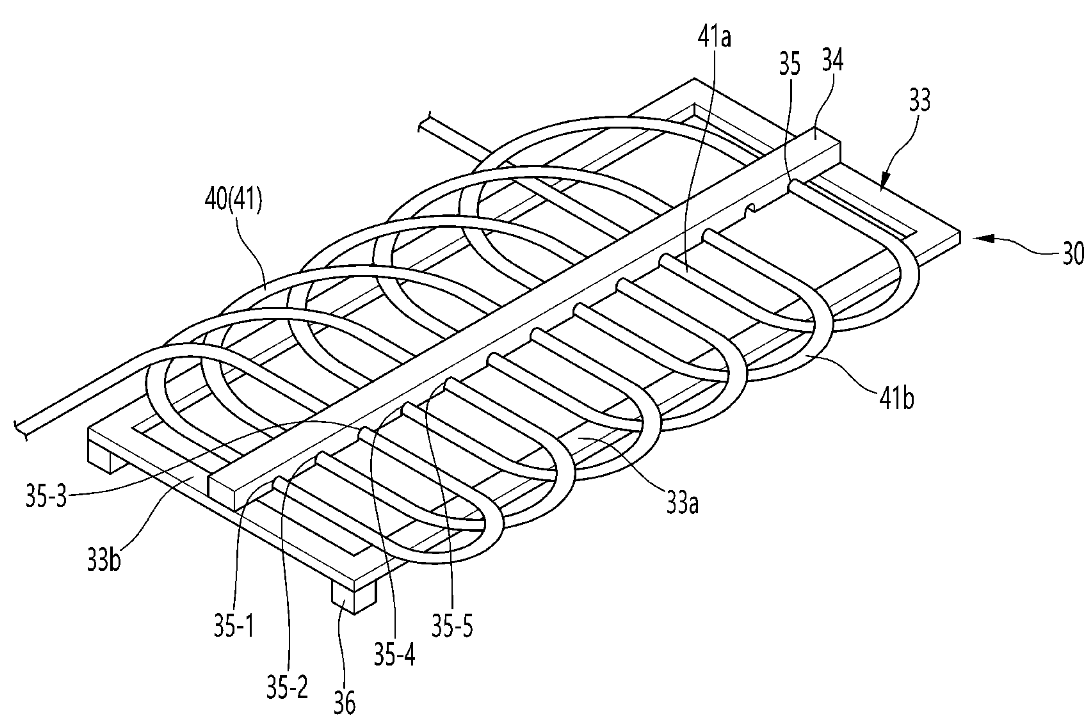
FIG. 7 is a perspective view illustrating another example of a cable fixing unit.

FIG. 7 is a perspective view illustrating another example of a cable fixing unit.

As another example, the cable fixing unit 30 may include one or more frames 33 or 34. In this case, compared to the case in which the cable fixing unit 30 is composed of the panels 31 and 32, an area size for covering the one surface (e.g., the upper surface) of each stage of the battery modules 20 is reduced and ventilation is excellent.

In more detail, the cable fixing unit 30 may include a support frame 33 for supporting the optical fiber cable 40 and a fixing frame 34 connected to the support frame 33 and to which the optical fiber cable 40 is fixed.

The support frame 33 may have a shape of a square frame. For example, the support frame 33 may include a pair of long frames 33*a* that are parallel to each other and a pair of short frames 33*b* that respectively connect ends of the pair of long frames on respective sides to each other and are parallel to each other.

The long frame 33*a* may be formed longer than a depth, that is, a long side, of the stage of the battery modules 2. The short frame 33*b* may be formed shorter than a width, that is, a short side, of the stage of the battery modules 20.

The support frame 33 may be made of a synthetic resin or a metal material. That is, the support frame 33 may be made of a material having high heat resistance and high thermal conductivity. Accordingly, the support frame 33 may dissipate heat from the battery modules while in contact with the upper surfaces of the battery modules 20.

The support frame 33 may have a stopper 36 capable of limiting a degree of insertion thereof when the support frame 33 is inserted between the pair of stages of battery modules 20 adjacent to each other. The stopper 36 may protrude downward from the short frame 33*b* or protrude downward from an end of the long frame 33*a*.

The fixing frame 34 may extend parallel to the long frame 33*a* and may connect central portions of the pair of short frames 33*b* to each other. The fixing frame 34 may have a bar shape.

The fixing frame 34 may be disposed to be stepped upwardly of the support frame 33. A plurality of fixing grooves 35 to which the optical fiber cable 40, more specifically, the inner section 41 is fixed may be defined in a lower surface of the fixing frame 34. The plurality of fixing grooves 35 may be spaced apart from each other along an extending direction of the fixing frame 34.

Each fixing groove 35 may extend in an elongated manner in a width direction of the fixing frame 34. A side cross-section of each fixing groove 35 may have a shape of a portion of a circle. An entrance of each fixing groove 35 may have a diameter smaller than the diameter of the optical fiber cable 40. Therefore, after the optical fiber cable 40 is fixed into the fixing groove 35 in an interference fit manner, the optical fiber cable 40 may not be removed from the fixing groove 35.

The optical fiber cable 40, more specifically, the inner section 41 is inserted and installed between the support frame 33 and the fixing frame 34.

The optical fiber cable 40 may be supported by the long frame 33*a* of the support frame 33, and may be fixed by being inserted into the fixing groove 35 of the fixing frame 34.

The optical fiber cable 40 may be disposed between the support frame 33 and the fixing frame 34 in a rolled or curved form. That is, the single optical fiber cable 40 may be disposed while being continuously wound. Windings of the optical fiber cables 40 may be disposed overlapping each other.

For example, the optical fiber cable 40 may advance in the extending direction of the fixing frame 34 while being wound in one of clockwise and counterclockwise directions. The optical fiber cable 40 may be disposed in a form wound multiple times in a form of a spring and then fell down to one side. The optical fiber cable 40 may be wound in an elliptical shape. The optical fiber cable 40 may be wound such that the windings thereof partially overlap each other.

The optical fiber cable 40 may be placed on the pair of long frames 33*a*. That is, a width of the shape formed by the optical fiber cable 40 may be greater than the length of the short frame 33*b*.

An order in which the optical fiber cable 40 is inserted into the plurality of fixing grooves 35 may follow a predetermined rule. For example, the plurality of fixing grooves 35 may be sequentially named as a first fixing groove 35-1, a second fixing groove 35-2, . . . , and an n-th fixing groove **35-*n* along the extending direction of the fixing frame 34. In this regard, the optical fiber cable 40 may be inserted in an order of the third fixing groove 35-3, the first fixing groove 35-1, the fifth fixing groove 35-5, the second fixing groove 35-2, the seventh fixing groove 35-7, the fourth fixing groove 35-4, the ninth fixing groove 35-9, the sixth fixing groove 35-6, . . . . For example, from a second winding of the optical fiber cable 40, a rule of increasing 5 fixing grooves and decreasing 3** fixing grooves may be followed. Such rule may vary as needed.

The configuration of the cable fixing unit 30 may not be limited thereto, and the cable fixing unit 30 may include an upper frame and a lower frame and the optical fiber cable 40 may be fixed by being inserted between the upper frame and the lower frame. In addition, the cable fixing unit 30 may be composed of a single frame in which the fixing grooves 35 are defined.

Figure 8:
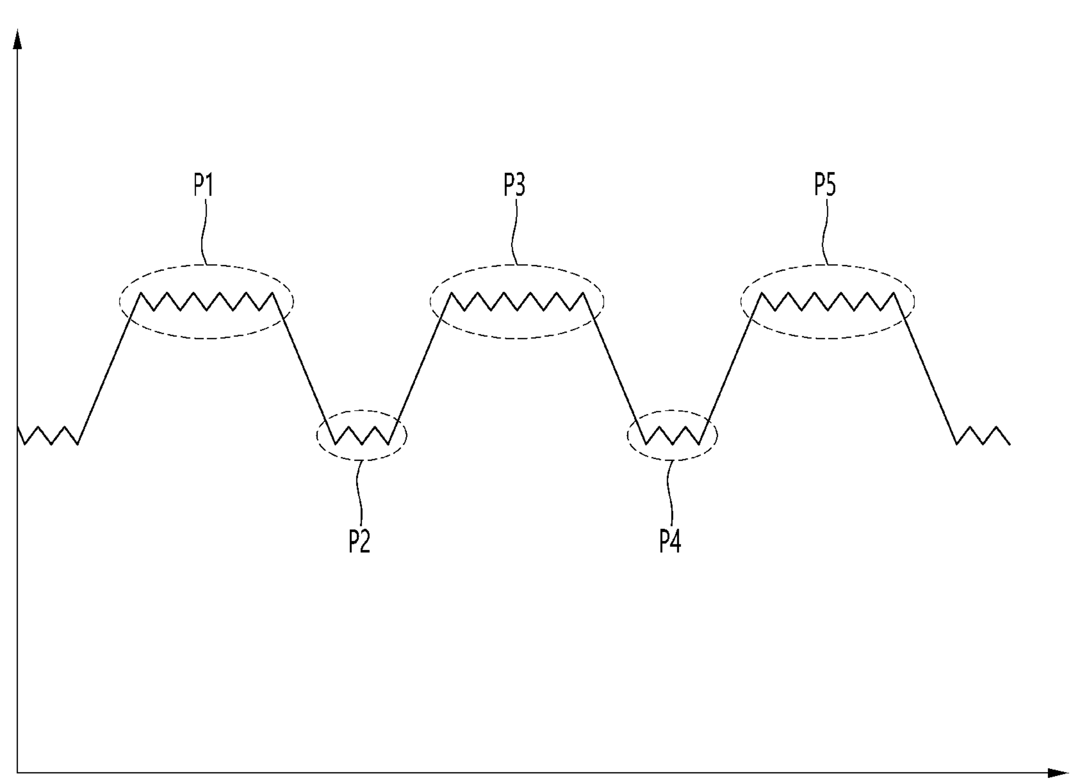
FIG. 8 is an example of a graph displayed on a display.

FIG. 8 is an example of a graph displayed on a display.

The controller 60 may visualize the plurality of temperature information sensed from the plurality of sensing spots 45 included in the optical fiber cable 40 as a graph and output the visualized graph on the display 61. The controller 60 may output the graph to an external terminal or the like.

An order in which sections are arranged along a horizontal axis of the graph may correspond to an order of the sensing spots 45 arranged along a length direction of the optical fiber cable 40, and a vertical axis of the graph may correspond to the temperature sensed from the sensing spot 45.

The temperature of the space between the plurality of battery modules 20 in each stage is generally higher than the temperature outside the space. Therefore, the temperature sensed from the inner section 41 of the optical fiber cable 40 may be higher than the temperature sensed from the outer section 42.

Therefore, in the graph displayed on the display 61, relatively high-temperature sections P1, P3, and P5 and relatively low-temperature sections P2 and P4 may be alternately repeated. That is, the high-temperature sections P1, P3, and P5 may correspond to the temperatures sensed from the inner sections 41 of the optical fiber cable 40, and the low-temperature sections P2 and P4 may correspond to the temperatures sensed from the outer sections 42 of the optical fiber cable 40.

Therefore, an administrator may intuitively identify the high-temperature sections P1, P3, and P5 and the low-temperature sections P2 and P4 by looking at the graph. That is, the administrator may intuitively identify whether a specific portion of the graph is the temperature of the space between the plurality of battery modules 20 in each stage or the temperature outside the space.

In addition, because the plurality of high-temperature sections P1, P3, and P5 are displayed separately from each other in the graph, the administrator may intuitively identify which stage battery module 20 temperature each portion of the graph corresponds to.

For example, the administrator may rapidly identify a first high-temperature section P1 corresponding to a temperature of one surface of one stage of the battery modules 20, a second high-temperature section P3 corresponding to a temperature of one surface of another stage of the battery modules 20, and a third high-temperature section P5 corresponding to a temperature of one surface of still another stage of the battery modules 20.

When the outer section 42 of the optical fiber cable 40 does not include the sensing spot 45, only the plurality of high-temperature sections P1, P3, and P5 will be continuously displayed in the graph. Therefore, it is difficult for the administrator to intuitively identify which stage battery module 20 temperature each portion of the graph corresponds to, and there is an inconvenience that the administrator has to distinguish the same via a separate process. The present disclosure may reduce such inconvenience.

Figure 9:
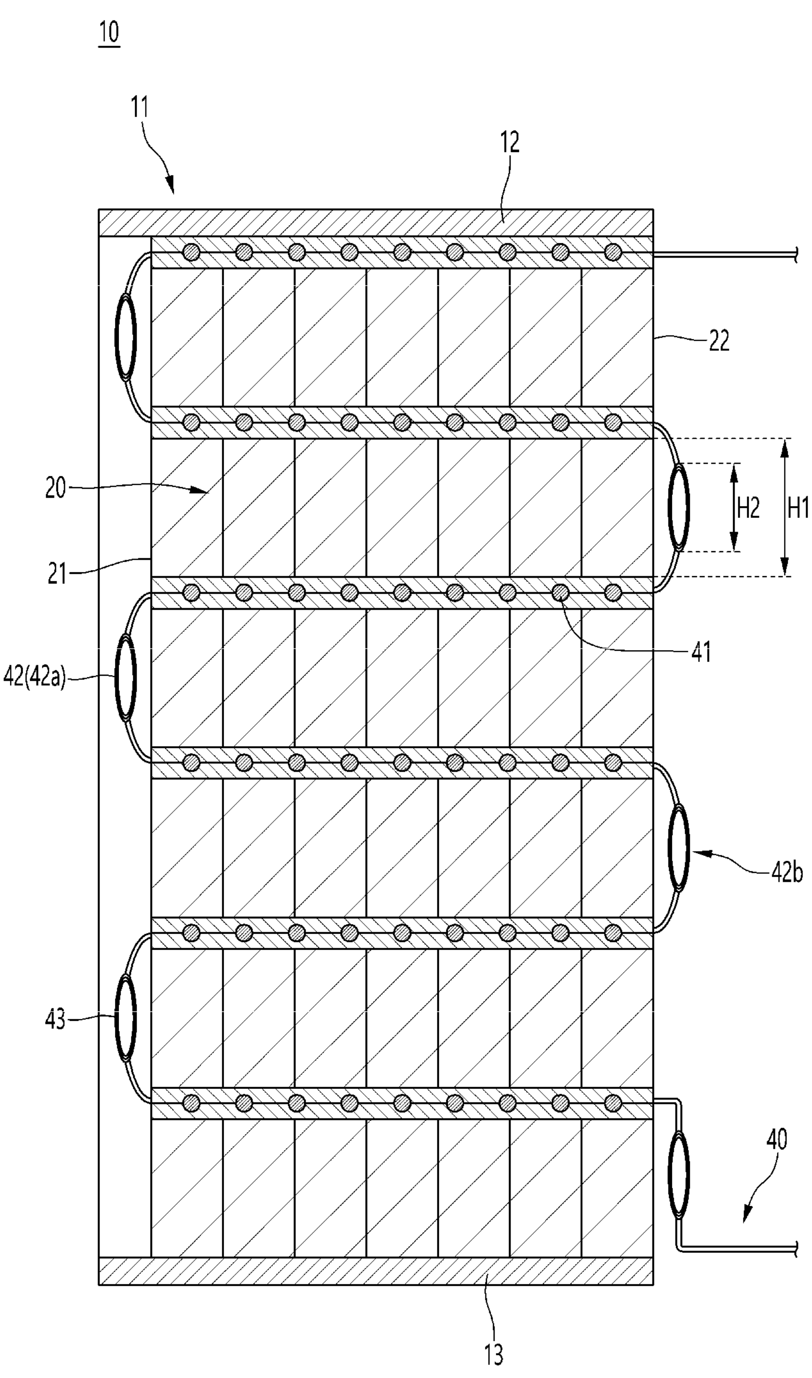
FIG. 9 is a cross-sectional view of an energy storage device according to another embodiment of the present disclosure.

FIG. 9 is a cross-sectional view of an energy storage device according to another embodiment of the present disclosure.

The present embodiment is the same as the embodiment described above except for the arrangement of the outer sections 42 of the optical fiber cable 40. Therefore, duplicated descriptions will be omitted and differences will be mainly described.

In the present embodiment, the plurality of outer sections 42 may include a first outer section 42*a* located in front of a foremost battery module 20 in a stage and a second outer section 42*b* located at the rear of a rearmost battery module 20 in a stage adjacent to the stage of the foremost battery module 20.

The first outer section 42*a* and the second outer section 42*b* may be alternately positioned along the optical fiber cable 40.

The first outer section 42*a* may be positioned adjacent to the front surface 21 of the foremost battery module 20, and the second outer section 42*b* may be positioned adjacent to a rear surface 22 of the rearmost battery module 20.

Each of the outer sections 42*a* and 42*b* may include the curled portion 43 including the at least one sensing spot 45. The curled portion 43 of the first outer section 42*a* may be positioned to overlap the front surface 21 of the foremost battery module 20 in the horizontal direction. The curled portion 43 of the second outer section 42*b* may be positioned to overlap the rear surface 22 of the rearmost battery module 20 in the horizontal direction.

Therefore, a temperature of the front surface 21 of the foremost battery module or a temperature around the front surface 21 may be sensed via the first outer section 42*a*. In addition, a temperature of the rear surface 22 of the rearmost battery module 20 or a temperature around the rear surface 22 may be sensed via the second outer section 42*b*.

Thus, the optical fiber cable 40 according to the present embodiment has an advantage of being able to more extensively sense the temperature distribution around the battery modules 20.

In addition, the plurality of curled portions 43 included in the plurality of first outer sections 42*a* may be vertically arranged in a line. Accordingly, the temperatures of the same area of the front surfaces 21 of the plurality of foremost battery modules 20 in the respective stages may be consistently measured via the plurality of curled portions 43.

In addition, the plurality of curled portions 43 included in the plurality of second outer sections 42*b* may be vertically arranged in a line. Accordingly, the temperatures of the same area of the rear surfaces 22 of the plurality of rearmost battery modules 20 in the respective stages may be consistently measured via the plurality of curled portions 43.

The above description is merely an example of the technical idea of the present disclosure, and a person having ordinary knowledge in the technical field to which the present disclosure belongs will be able to make various modifications and variations without departing from the essential characteristics of the present disclosure.

Therefore, the embodiments disclosed in the present disclosure are not intended to limit, but to describe the technical idea of the present disclosure, and the scope of the technical idea of the present disclosure is not limited by such embodiment.

The scope of protection of the present disclosure should be interpreted according to the scope of the following claims, and all technical ideas within an equivalent scope should be construed as being included in the scope of rights of the present disclosure.

What is claimed is:

1. A temperature measurement device disposed in an energy storage device equipped with a plurality of power device modules arranged in multiple stages, the temperature measurement device comprising:

an optical fiber cable including a plurality of sensing spots for sensing temperatures, wherein the plurality of sensing spots are spaced apart from each other by a predetermined unit spacing; and a plurality of cable fixing units respectively disposed between the multiple stages of the plurality of power device modules and fixing the optical fiber cable, wherein the optical fiber cable includes:

a plurality of inner sections respectively positioned between the multiple stages of the plurality of power device modules and respectively fixed to the cable fixing units; and at least one outer section for connecting the plurality of inner sections to each other in series and having a length greater than the unit spacing, and wherein the outer section includes a curled portion positioned to overlap one circumferential surface of an outermost power device module in a stage in a horizontal direction and having a shape rolled at least once and includes at least one sensing spot that detects a temperature of the optical fiber cable.

2. The temperature measurement device of claim 1, further comprising:

a controller connected to the optical fiber cable, wherein the controller is configured to visualize temperature information sensed from the plurality of sensing spots as a graph and output the graph on a display.

3. The temperature measurement device of claim 1, wherein the outer section is located adjacent to one circumferential surface of an outermost power device module in a stage.

4. The temperature measurement device of claim 1, wherein the outer section includes a plurality of outer sections, wherein a plurality of curled portions of the plurality of outer sections are arranged in a row in a vertical direction.

5. The temperature measurement device of claim 1, wherein a curvature radius of the curled portion is 20 times or more the cross-sectional diameter of the optical fiber cable.

6. The temperature measurement device of claim 1, wherein the number of sensing spots located in the inner section is greater than the number of sensing spots located in the outer section.

7. The temperature measurement device of claim 1, wherein the outer section includes a plurality of outer sections, wherein the plurality of outer sections include:

a first outer section located in front of a foremost power device module in one stage; and a second outer section located at the rear of a rearmost power device module in another stage adjacent to the one stage, wherein the first outer section and the second outer section are located alternately with each other.

8. An energy storage device comprising:

a rack;

a plurality of power device modules installed in multiple stages in the rack;

an optical fiber cable including a plurality of sensing spots for sensing temperatures, wherein the plurality of sensing spots are spaced apart from each other by a predetermined unit spacing; and a plurality of cable fixing units respectively disposed on upper surfaces of power device modules in the respective stages, and fixing the optical fiber cable, wherein the optical fiber cable includes:

a plurality of inner sections respectively positioned between the multiple stages of the plurality of power device modules and respectively fixed to the cable fixing units; and at least one outer section for connecting the plurality of inner sections to each other in series and having a length greater than the unit spacing, and wherein the outer section includes a curled portion positioned to overlap one circumferential surface of an outermost power device module in a stage in a horizontal direction and having a shape rolled at least once, and includes at least one sensing spot that detects a temperature of the optical fiber cable.

9. The energy storage device of claim 8, further comprising:

at least one hook formed on the rack and fixing the at least one outer section of the optical fiber cable.

10. The energy storage device of claim 9, wherein the power device module is a battery module.

* * * * *